United States Patent
Ellis et al.

(10) Patent No.: US 11,348,141 B2
(45) Date of Patent: May 31, 2022

(54) MOBILE CHAT APPLICATION INTEGRATION WITH PROMOTIONAL SYSTEMS

(71) Applicant: Groupon, Inc., Chicago, IL (US)

(72) Inventors: Scott Ellis, Chicago, IL (US); Devdatta Gangal, Mountain View, CA (US); Jayesh Joy, Chicago, IL (US); Hamish Barney, Palo Alto, CA (US)

(73) Assignee: Groupon, Inc., Chicago, IL (US)

( * ) Notice: Subject to any disclaimer, the term of this patent is extended or adjusted under 35 U.S.C. 154(b) by 151 days.

(21) Appl. No.: 15/191,348

(22) Filed: Jun. 23, 2016

(65) Prior Publication Data

US 2016/0379269 A1 Dec. 29, 2016

Related U.S. Application Data

(60) Provisional application No. 62/185,421, filed on Jun. 26, 2015.

(51) Int. Cl.
*G06Q 30/02* (2012.01)
*H04L 67/306* (2022.01)
(Continued)

(52) U.S. Cl.
CPC ..... *G06Q 30/0269* (2013.01); *G06F 16/9535* (2019.01); *G06Q 30/0246* (2013.01);
(Continued)

(58) Field of Classification Search
CPC ........... G06Q 30/0269; G06Q 30/0246; G06Q 30/0251; G06Q 50/01; G06F 16/9535;
(Continued)

(56) References Cited

U.S. PATENT DOCUMENTS 6,754,647 B1 * 6/2004 Tackett ................. G06F 17/279
700/246
7,243,078 B1 * 7/2007 Lewis-Hawkins ... G06Q 30/016
705/26.41
(Continued)

FOREIGN PATENT DOCUMENTS

| WO | 2014/198132 A1 | 12/2014 | |
| WO | WO-2016154603 A1 * | 9/2016 | ........... H04L 12/185 |
| WO | WO 2016/210164 A1 | 12/2016 | |

OTHER PUBLICATIONS

BOTS: An introduction for developers, Jun. 24, 2015, https://core.telegram.org/bots (Year: 2015).*
(Continued)

*Primary Examiner* — Dipen M Patel
(74) *Attorney, Agent, or Firm* — Alston & Bird LLP

(57) ABSTRACT

Techniques for programmatically interfacing with mobile chat sessions are discussed herein. Some embodiments may include one or more servers configured to: access the mobile chat session hosted by the mobile chat server; receive input chat data from the mobile chat server; determine promotions scores of candidate promotions based at least in part on the input chat data; and provide the output chat data to the mobile chat server including an electronic marketing communication of one or more promotions selected based on the promotion scores. The one or more servers may be further configured to programmatically interact with chat accounts within the mobile chat session, such as to request additional search terms for improved promotion relevance targeting, among other things.

20 Claims, 9 Drawing Sheets

(51) Int. Cl.
  *H04L 51/00*      (2022.01)
  *G06F 16/9535*    (2019.01)
  *H04L 51/046*     (2022.01)
  *G06Q 50/00*      (2012.01)
  *H04W 80/10*      (2009.01)

(52) U.S. Cl.
  CPC ......... *G06Q 30/0251* (2013.01); *G06Q 50/01* (2013.01); *H04L 51/046* (2013.01); *H04L 51/16* (2013.01); *H04L 67/306* (2013.01); *H04W 80/10* (2013.01)

(58) Field of Classification Search
  CPC ..... H04L 51/046; H04L 51/16; H04L 67/306; H04W 80/10
  See application file for complete search history.

(56) References Cited

U.S. PATENT DOCUMENTS

| | | | | |
|---|---|---|---|---|
| 8,239,461 | B2* | 8/2012 | Jones | G06Q 30/02 709/206 |
| 8,762,862 | B2* | 6/2014 | Singh | G06Q 30/02 709/204 |
| 9,098,827 | B2* | 8/2015 | Jagannathan | H04L 51/04 |
| 9,450,901 | B1* | 9/2016 | Smullen | H04L 51/046 |
| 2002/0133347 | A1* | 9/2002 | Schoneburg | G06F 17/27 704/257 |
| 2003/0182391 | A1* | 9/2003 | Leber | G06F 17/30864 709/217 |
| 2004/0267885 | A1* | 12/2004 | Zimmermann | H04L 63/083 709/206 |
| 2005/0021652 | A1* | 1/2005 | McCormack | H04L 51/04 709/207 |
| 2006/0080130 | A1* | 4/2006 | Choksi | G06Q 30/016 705/1.1 |
| 2007/0043878 | A1* | 2/2007 | Carlson | G06F 17/30905 709/246 |
| 2008/0214156 | A1 | 9/2008 | Ramer et al. | |
| 2009/0299991 | A1* | 12/2009 | Zarzar Charur | G06F 16/3322 |
| 2009/0319516 | A1* | 12/2009 | Igelman | G06Q 30/02 |
| 2011/0206198 | A1* | 8/2011 | Freedman | G06Q 30/06 379/265.03 |
| 2012/0215640 | A1 | 8/2012 | Ramer et al. | |
| 2012/0215871 | A1* | 8/2012 | Zhang | G06Q 30/0269 709/206 |
| 2013/0144961 | A1* | 6/2013 | Park | H04L 51/046 709/206 |
| 2013/0167044 | A1* | 6/2013 | Graves | H04M 3/5191 715/756 |
| 2013/0346886 | A1* | 12/2013 | Cauchois | H04L 51/046 715/758 |
| 2014/0046761 | A1* | 2/2014 | Ramer | G06Q 30/02 705/14.53 |
| 2014/0195621 | A1* | 7/2014 | Rao Dv | H04L 12/1827 709/206 |
| 2014/0207882 | A1* | 7/2014 | Joo | H04L 51/02 709/206 |
| 2015/0066594 | A1* | 3/2015 | Li | G06Q 30/0202 705/7.31 |
| 2015/0319203 | A1* | 11/2015 | Jeremias | G06Q 30/0641 715/753 |
| 2017/0048170 | A1* | 2/2017 | Smullen | H04L 67/322 |
| 2017/0148055 | A1* | 5/2017 | Boothroyd | G06Q 30/02 |
| 2018/0040020 | A1* | 2/2018 | Ku | G06F 16/9535 |

OTHER PUBLICATIONS

V Yahoo Pandora Bot, Mar. 14, 2010, https://sites.google.com/site/nickjuly4/yahoopandora (Year: 2010).*
Xu, J., Kang, Q., Song, Z., & Clarke, C. P. (2015). Applications of mobile social media: WeChat among academic libraries in china. Journal of Academic Librarianship, 41(1), 21-30. doi:http://dx.doi.org/10.1016/j.acalib.2014.10.012 (Year: 2015).*
BOTS: An introduction for developers, Sep. 8, 2015, https://core.telegram.org/bots (Year: 2015).*
Yahoo Pandora Bot, Mar. 25, 2012, https://sites.google.com/site/nickjuly4/yahoopandora (Year: 2012).*
Stefanie Olsen, AOL tries out new IM chat bot, Jan. 27, 2003, cnet tech, https://www.cnet.com/tech/services-and-software/aol-tries-out-new-im-chat-bot/ (Year: 2003).*
Stefanie Olsen, AIM chat bot comes back to life, Jan. 30, 2003, ZDNet, https://www.zdnet.com/article/aim-chat-bot-comes-back-to-life/ (Year: 2003).*
PCT International Search Report and Written Opinion of the International Searching Authority for application PCT/US2016/039069 dated Sep. 14, 2016.
U.S. Appl. No. 14/824,912 as filed Aug. 12, 2015.
Extended European Search Report for corresponding European Application No. 16815327.8 dated Dec. 7, 2018, 7 pages.
Office Action for European Application No. 16815327.8 dated Jan. 28, 2021.

* cited by examiner

MOBILE CHAT APPLICATION INTEGRATION WITH PROMOTIONAL SYSTEMS

CROSS-REFERENCE TO RELATED APPLICATIONS

This application claims the benefit of U.S. Provisional Patent Application No. 62/185,421, titled "Mobile Chat Application Integration with Promotional Systems," filed Jun. 26, 2015, which is incorporated by reference herein in its entirety.

FIELD

Embodiments of the invention relate, generally, to techniques for programmatic interfacing with mobile chat servers and mobile consumer devices.

BACKGROUND

Promotional systems provide promotions associated with merchants to consumer devices through various electronic communication channels such as email, application alert, webpage, text message, among other things. The effectiveness of promotional offers can depend on factors such as the effectiveness of the promotional system in providing programmatic offers to the consumer and the effectiveness of the interfaces that are used. In this regard and others as discussed herein, areas for improving current techniques have been identified.

BRIEF SUMMARY

Through applied effort, ingenuity, and innovation, solutions to improve such systems have been realized and are described herein. Various embodiments of the present invention are directed to improved apparatuses, methods, and computer readable media for programmatic interfacing with mobile chat servers and mobile consumer devices.

For example, some embodiments may include a system for interfacing with a mobile chat session hosted by a mobile chat server via a network, comprising: one or more databases configured to: store consumer accounts, wherein each consumer account includes consumer data associated with a chat account for accessing the mobile chat session; and store promotion data defining promotions; one or more servers configured to: connect with the mobile chat server via a network; access the mobile chat session hosted by the mobile chat server; receive input chat data from the mobile chat server, wherein the input chat data defines a message generated by a consumer device with a concurrent connection to the mobile chat session; analyze the input chat data to determine a first chat account and associated message text; determine a first consumer account including first consumer data associated with the first chat account; determine one or more search terms based on the message text; determine promotions scores of candidate promotions based at least in part on the one or more search terms, the promotion data, and the first consumer data; determine a promotion ranking of the candidate promotions based on the promotions scores; determine a selected promotion based on the promotion ranking; generate output chat data defining an electronic marketing communication of the selected promotion; and provide the output chat data to the mobile chat server.

In some embodiments, the one or more servers configured to determine the promotions scores of candidate promotions may include the one or more servers being configured to: determine promotion search parameters; determine promotion search parameter values based on matching the one or more search terms with the promotion search parameters; and determine the promotion scores of the candidate promotions based on the promotion search parameter values, the promotion data, and the first consumer data.

In some embodiments, the one or more servers may be further configured to: determine a missing promotion search parameter value based on matching the one or more search terms with the promotion search parameters; generate second output chat data defining a request for the missing promotion search parameter; and provide the second output chat data to the mobile chat server.

In some embodiments, the one or more servers may be further configured to: receive second input chat data from the consumer device; analyze the second input chat data to determine associated second message text; determine one or more second search terms based on the second message text; determine whether the one or more second search terms includes the missing promotion search parameter value; and in response to determining that the one or more second search terms includes the missing promotion search parameter value, determine a second promotion search parameter value based on the one or more second search terms; and determine the promotion scores of the candidate promotions based on the promotion parameter search values and the second promotion search parameter value.

In some embodiments, the missing promotion search parameter value may define one of: a location; a merchant; a price; a time; or an item category.

In some embodiments, the one or more servers may be further configured to: receive second chat data from the chat session, wherein the second chat data includes a second message generated by a second consumer device with a connection to the mobile chat session concurrent with the one or more servers and the consumer device; analyze the second chat data to determine a second chat account and associated second message text; determine a second consumer account including second consumer data associated with the second chat account; determine one or more second search parameters based on the second message text; and determine second promotions scores of the candidate promotions based at least in part on the one or more search parameters, the one or more second search parameters, the promotion data, the consumer data, and the second consumer data.

In some embodiments, the one or more servers may be further configured to: receive, from the mobile chat server via the network, an invitation to join the mobile chat session; and access the mobile chat session in response to receiving the invitation.

In some embodiments, the one or more servers may be further configured to: send an invitation to join the mobile session to the consumer device; receive, from the mobile chat server, an indication that the consumer device has accessed the mobile chat session; and access the mobile chat session in response to receiving the indication that the consumer device has accessed the mobile chat session.

In some embodiments, the system may further include a chat service terminal. The one or more servers may be further configured to: receive second input chat data from the mobile chat server, wherein the second input chat data defines a second message generated by the consumer device; attempt to extract one or more second search terms from the second input chat data; and in response to failing to extract the one or more second search terms from the second input chat data, connect the chat service terminal to the mobile chat session.

In some embodiments, the system may further include a chat service terminal. The one or more servers may be further configured to: receive second input chat data from the mobile chat server, wherein the second input chat data defines a second message generated by the consumer device; attempt to determine a second selected promotion based on the second input chat data; and in response to failing to determine a second selected promotion from the second input chat data, connect the chat service terminal to the mobile chat session.

In some embodiments, the one or more servers may be further configured to: identify a call command based on the message text; and in response to identifying the call command, analyze the input chat data to determine the first chat account and the associated message text.

Some embodiments may include a method for interfacing with a mobile chat session hosted by a mobile chat server via a network. The method may include: associating, by one or more servers, consumer accounts including consumer data with chat accounts for accessing the mobile chat session; determining, by the one or more servers, promotion data defining promotions; connecting, by the one or more servers, with the mobile chat server via the network; accessing, by the one or more servers, the mobile chat session hosted by the mobile chat server; receiving, by the one or more servers, input chat data from the mobile chat server, wherein the input chat data defines a message generated by a consumer device with a concurrent connection to the mobile chat session; analyzing, by the one or more servers, the input chat data to determine a first chat account and associated message text; determining a first consumer account including first consumer data associated with the first chat account; determining, by the one or more servers, one or more search terms based on the message text; determining, by the one or more servers, promotions scores of candidate promotions based at least in part on the one or more search terms, the promotion data, and the first consumer data; determining, by the one or more servers, a promotion ranking of the candidate promotions based on the promotions scores; determining, by the one or more servers, a selected promotion based on the promotion ranking; generating, by the one or more servers, output chat data defining an electronic marketing communication of the selected promotion; and providing, by the one or more servers, the output chat data to the mobile chat server.

In some embodiments, determining the promotions scores of candidate promotions may include: determining promotion search parameters; determining promotion search parameter values based on matching the one or more search terms with the promotion search parameters; and determining the promotion scores of the candidate promotions based on the promotion search parameter values, the promotion data, and the first consumer data.

In some embodiments, the method may further include, by the one or more servers: determining a missing promotion search parameter value based on matching the one or more search terms with the promotion search parameters; generating second output chat data defining a request for the missing promotion search parameter; and providing the second output chat data to the mobile chat server.

In some embodiments, the system may further include, by the one or more servers: receiving second input chat data from the consumer device; analyzing the second input chat data to determine associated second message text; determining one or more second search terms based on the second message text; determining whether the one or more second search terms includes the missing promotion search parameter value; and in response to determining that the one or more second search terms includes the missing promotion search parameter value, determining a second promotion search parameter value based on the one or more second search terms; and determining the promotion scores of the candidate promotions based on the promotion parameter search values and the second promotion search parameter value.

In some embodiments, the missing promotion search parameter value may define one of: a location; a merchant; a price; a time; or an item category.

16. The method of claim 15, wherein the missing promotion search parameter value defines one of: a location; a merchant; a price; a time; or an item category.

In some embodiments, the method may further include, by the one or more servers: receiving second chat data from the chat session, wherein the second chat data includes a second message generated by a second consumer device with a connection to the mobile chat session concurrent with the one or more servers and the consumer device; analyzing the second chat data to determine a second chat account and associated second message text; determining a second consumer account including second consumer data associated with the second chat account; determining one or more second search parameters based on the second message text; and determining second promotions scores of the candidate promotions based at least in part on the one or more search parameters, the one or more second search parameters, the promotion data, the consumer data, and the second consumer data.

In some embodiments, the method may further include, by the one or more servers: receiving, from the mobile chat server via the network, an invitation to join the mobile chat session; and access the mobile chat session in response to receiving the invitation.

In some embodiments, the method may further include, by the one or more servers: sending an invitation to join the mobile session to the consumer device; receiving, from the mobile chat server, an indication that the consumer device has accessed the mobile chat session; and accessing the mobile chat session in response to receiving the indication that the consumer device has accessed the mobile chat session.

In some embodiments, the method may further include, by the one or more servers: receiving second input chat data from the mobile chat server, wherein the second input chat data defines a second message generated by the consumer device; attempting to extract one or more second search terms from the second input chat data; and in response to failing to extract the one or more second search terms from the second input chat data, connecting a chat service terminal to the mobile chat session.

In some embodiments, the method may further include, by the one or more servers: receiving second input chat data from the mobile chat server, wherein the second input chat data defines a second message generated by the consumer device; attempting to determine a second selected promotion based on the second input chat data; and in response to failing to determine a second selected promotion from the second input chat data, connecting a chat service terminal to the mobile chat session.

In some embodiments, the method may further include, by the one or more servers: identifying a call command based on the message text; and in response to identifying the call command, analyzing the input chat data to determine the first chat account and the associated message text.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
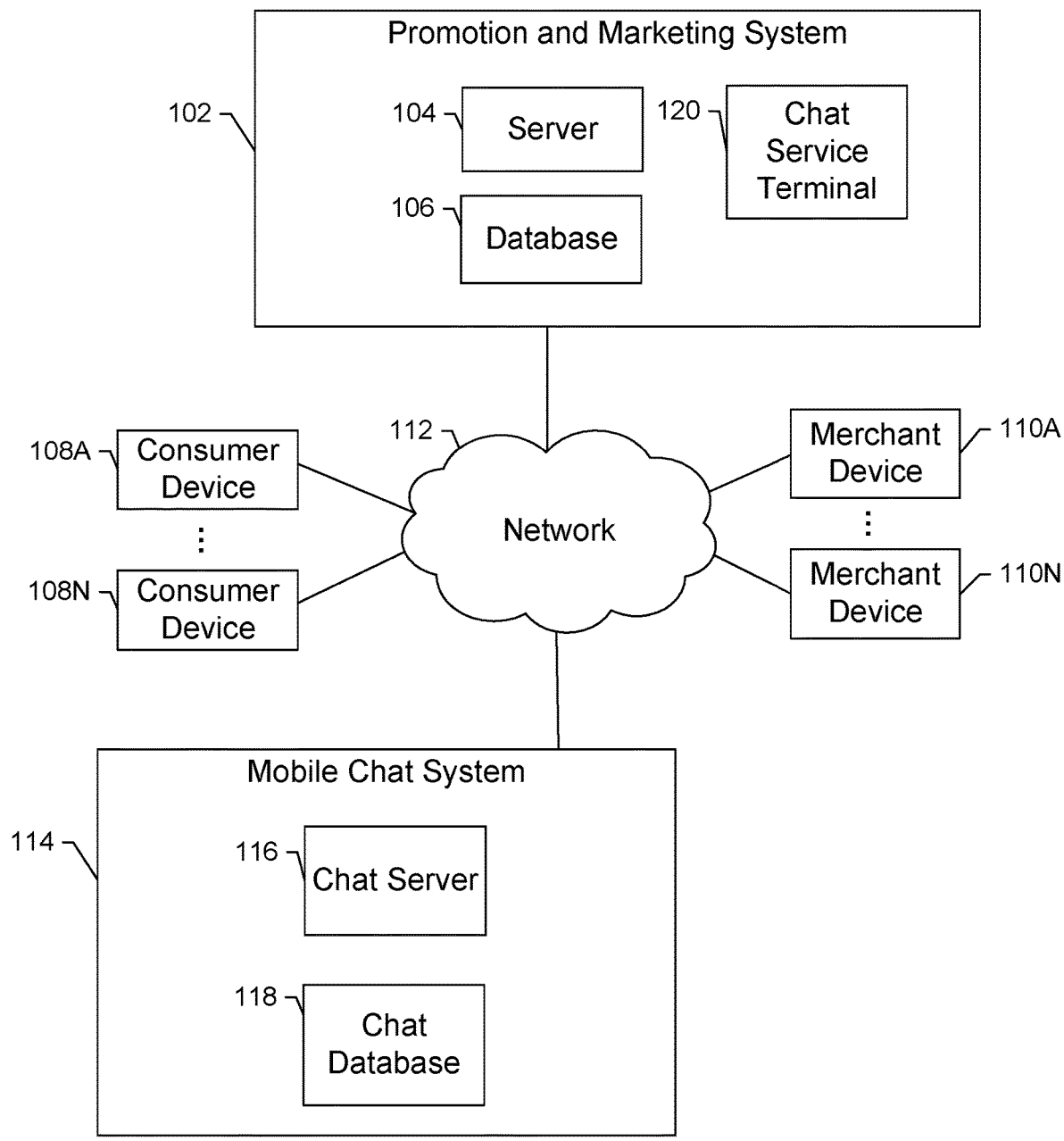
Figure 2:
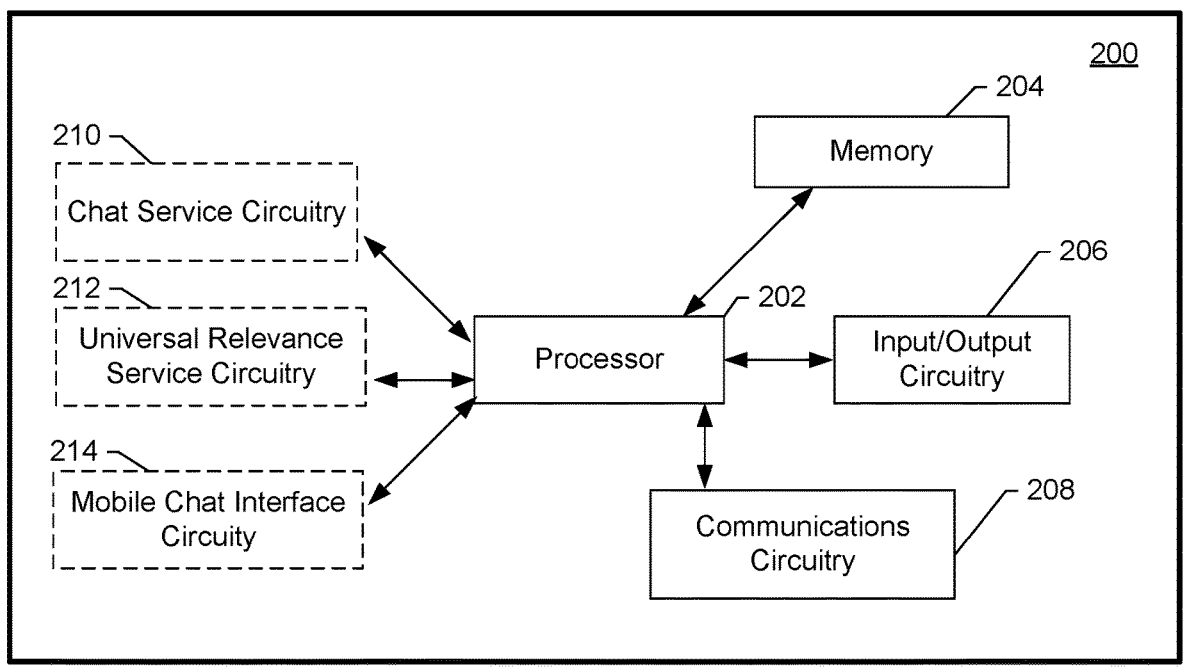
Figure 3:
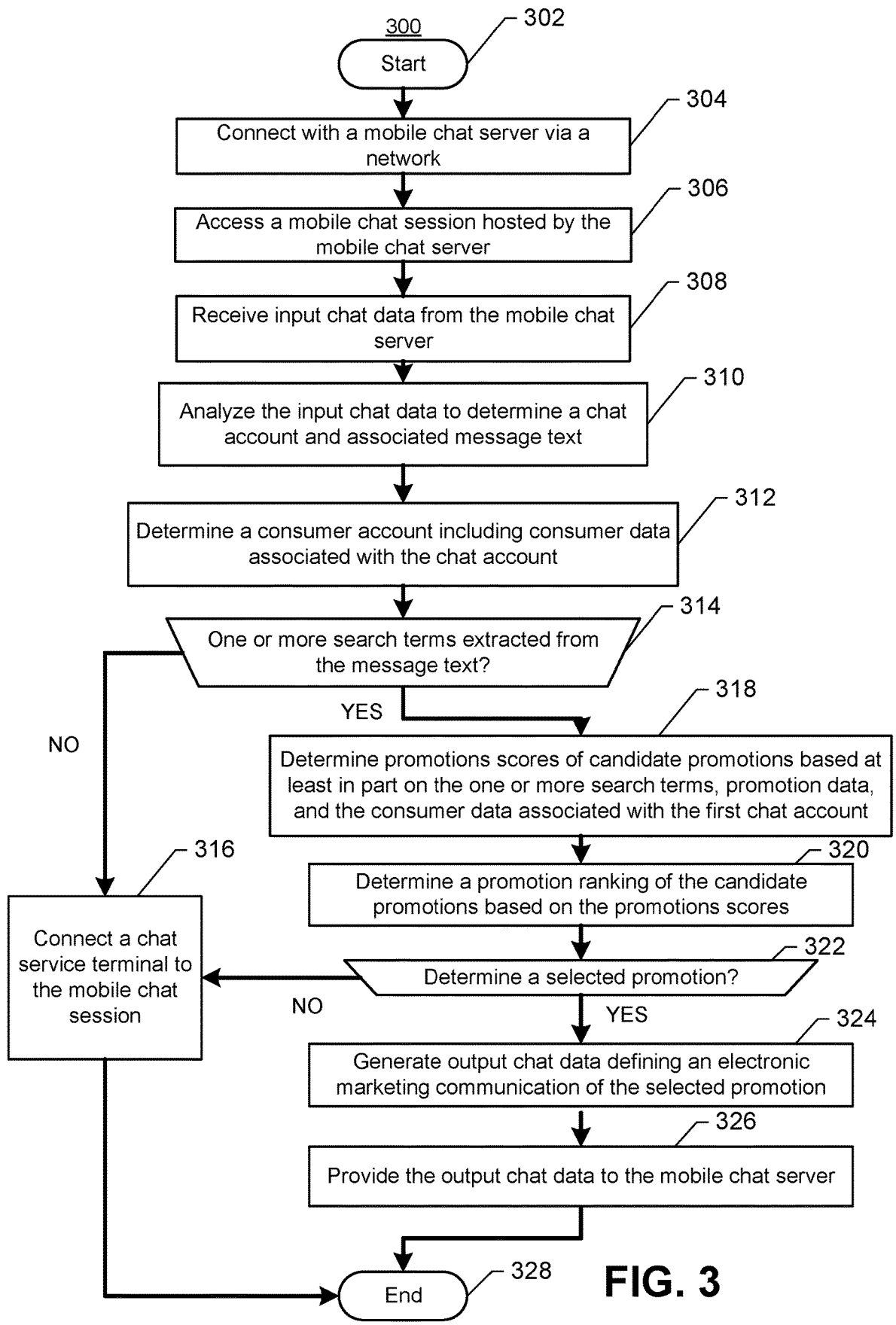
Figure 4:
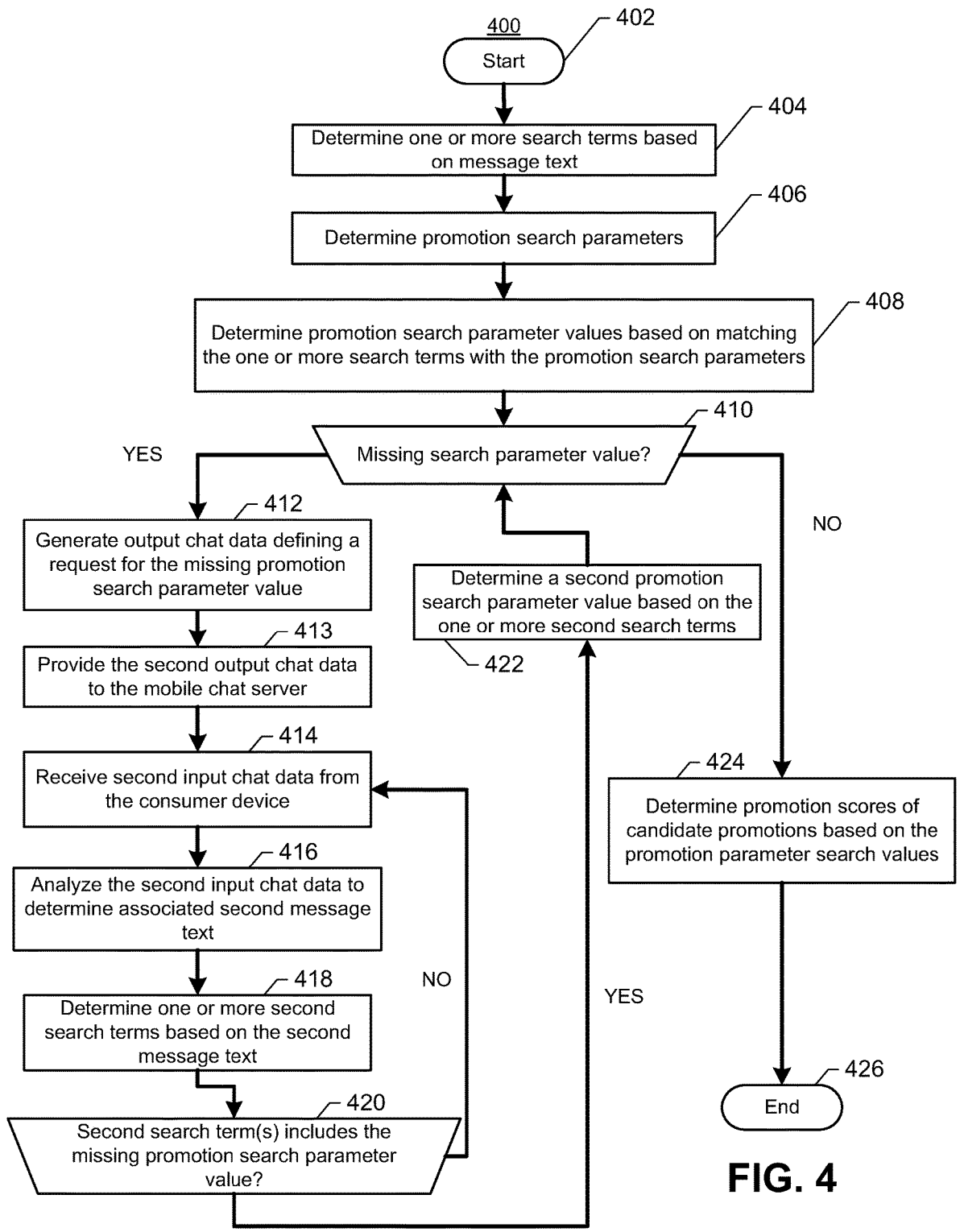
Figure 5:
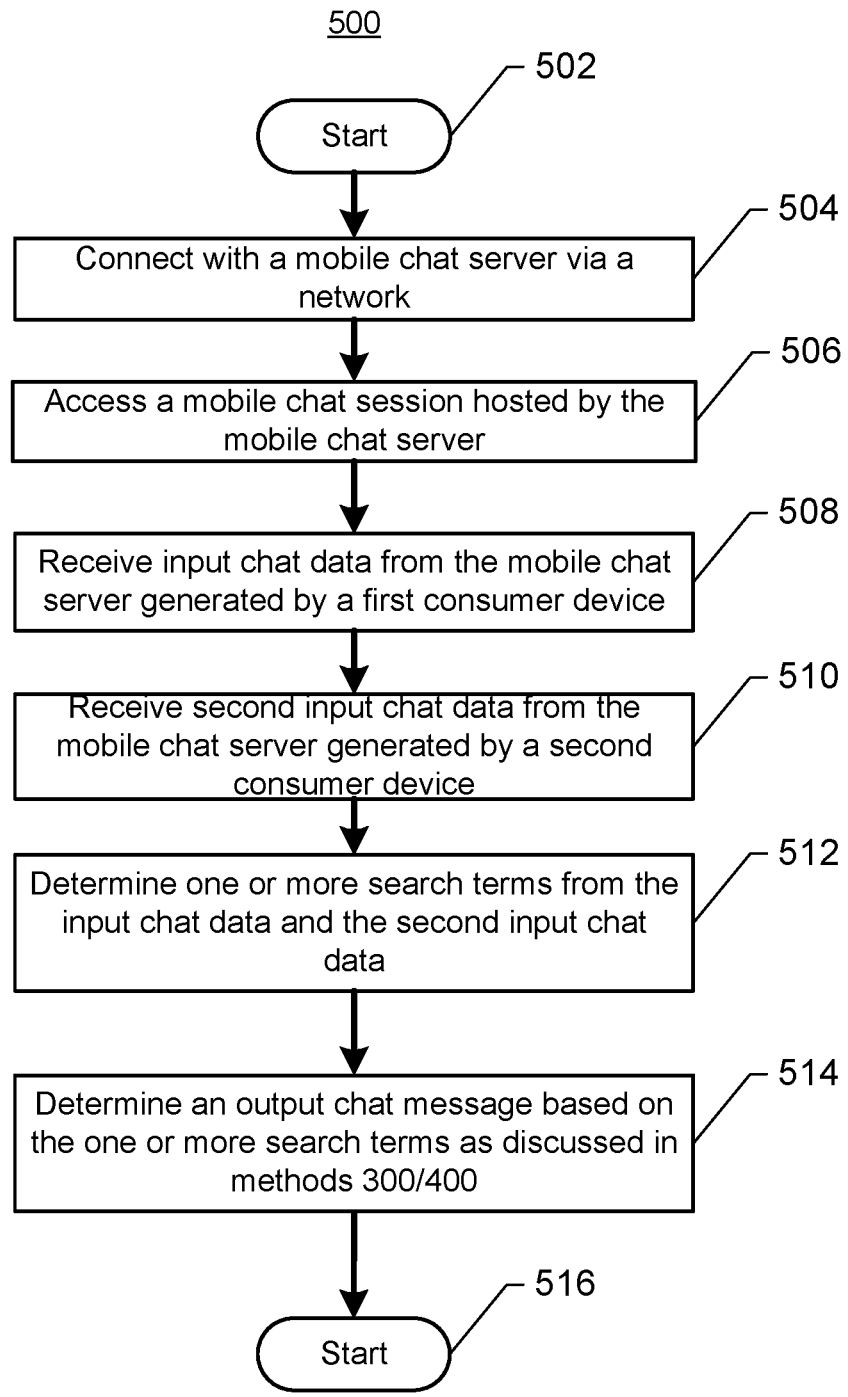
Figure 6:
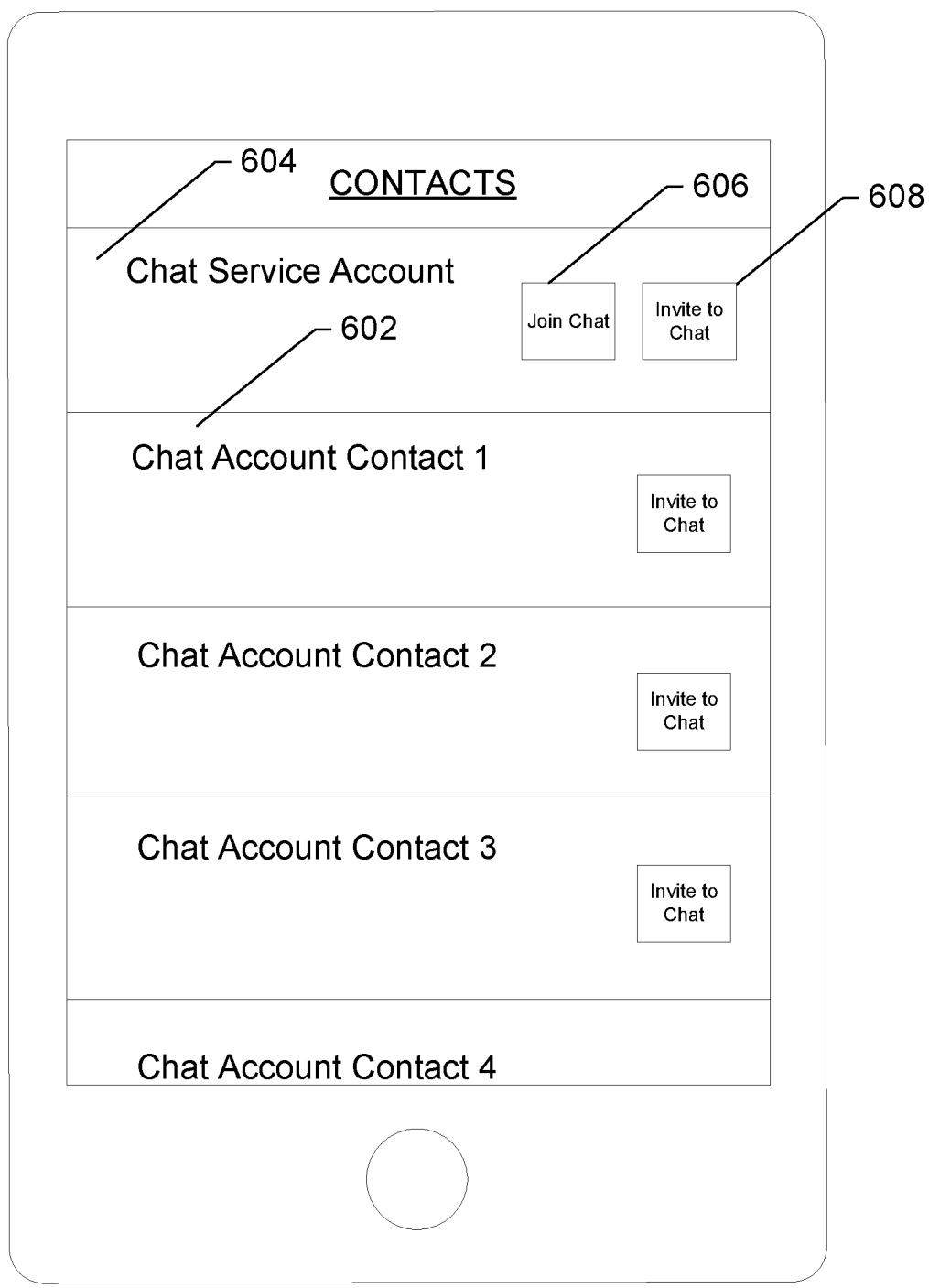
Figure 7:
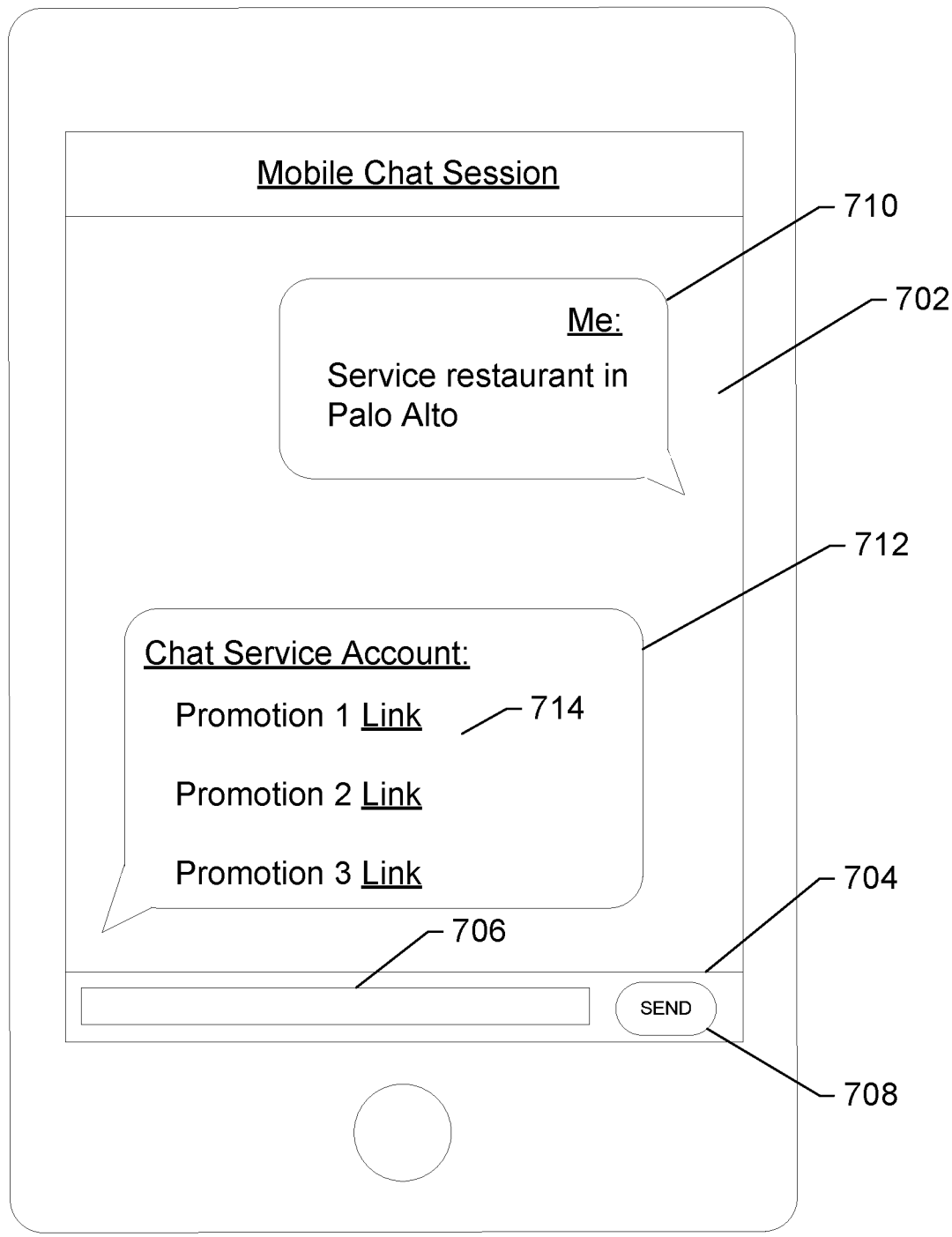
Figure 8:
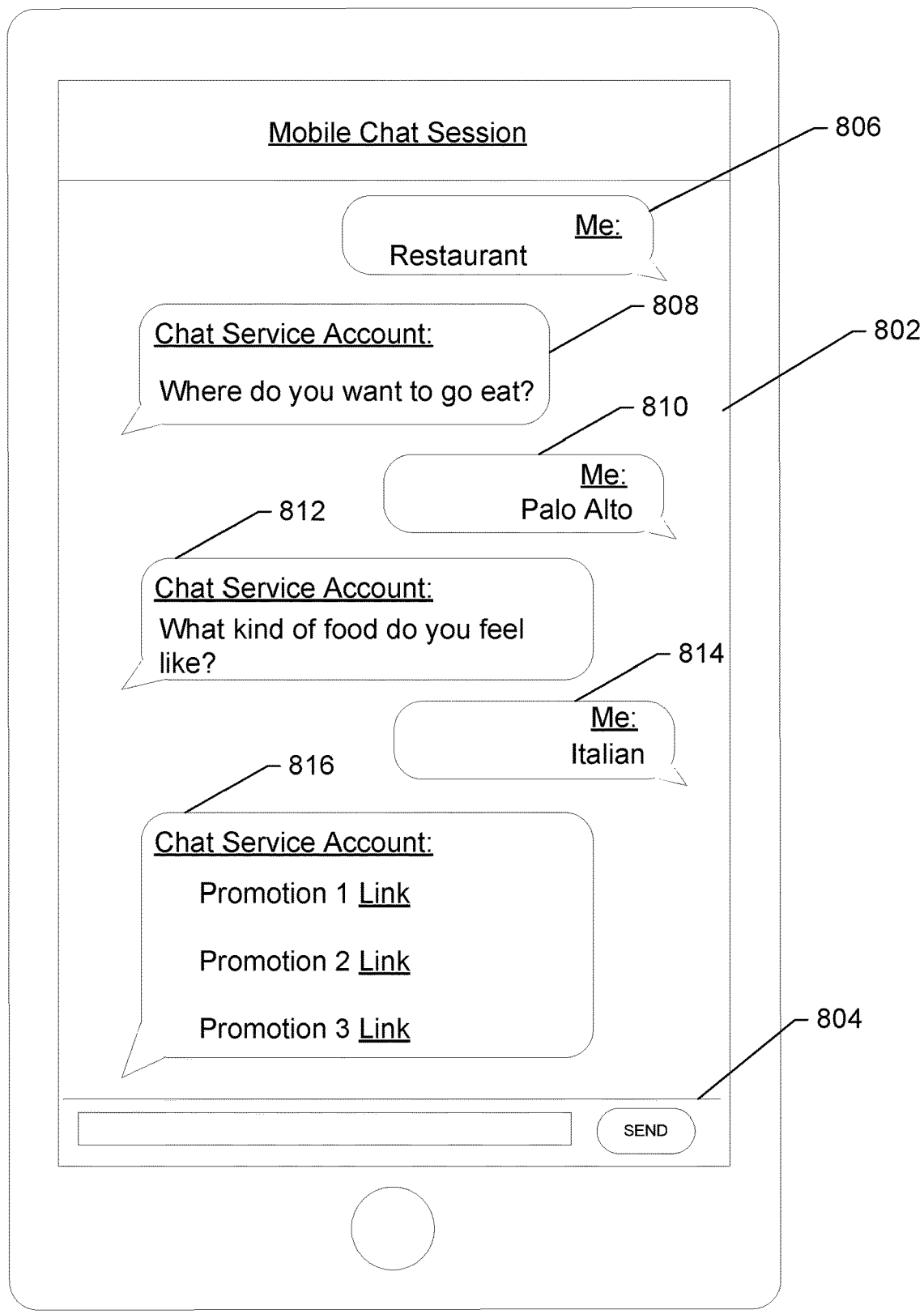
Figure 9:
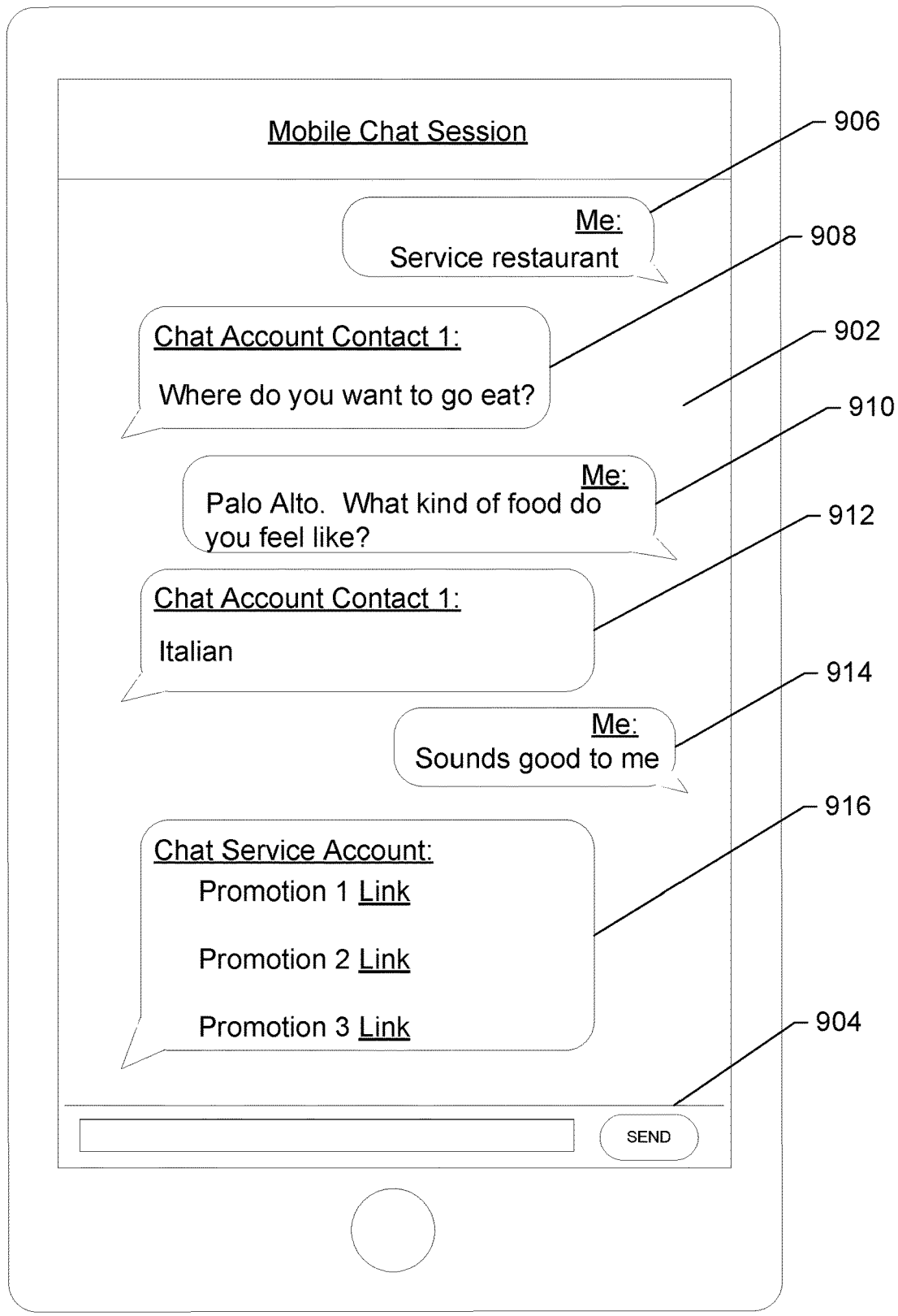

Having thus described some embodiments in general terms, reference will now be made to the accompanying drawings, which are not necessarily drawn to scale, and wherein:

FIG. 1 shows an example of a system, in accordance with some embodiments;

FIG. 2 shows a schematic block diagram of example circuitry, in accordance with some embodiments;

FIG. 3 shows a flow chart of an example of a method of providing output chat data defining an electronic marketing communication, in accordance with some embodiments FIG. 4 shows a flow chart of an example of a method of determining promotions scores of candidate promotions based on input chat data, in accordance with some embodiments;

FIG. 5 shows a flow chart of an example of a method of interfacing with a mobile chat session including multiple consumers, in accordance with some embodiments;

FIG. 6 shows an example of a contacts interface, in accordance with some embodiments;

FIG. 7 shows an example chat interface, in accordance with some embodiments;

FIG. 8 shows an example chat interface, in accordance with some embodiments; and FIG. 9 shows an example of a chat interface, in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" or may include a service that is accessible via one or more computing devices and that is operable to provide promotion and/or marketing services on behalf of one or more providers that are offering one or more instruments that are redeemable for goods, services, experiences and/or the like. The promotion and marketing service may be provided by a promotion and marketing system. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more electronic marketing communications or impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like. In some embodiments, the promotion and marketing service may include a chat service configured to interface with mobile chat applications to provide electronic marketing communications as chat messages. The chat service may be further configured to programmatically determine user intent from one or more chat users of a mobile chat session to extract search terms for targeted promotion selection. In some embodiments, the promotion and marketing service may further include a universal relevance service configured to receive search terms and provide targeted promotion scoring and/or ranking.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. The parameters of a promotion may be defined by promotion data. In some embodiments, the promotion data may define one or more redemption locations for a promotion, such as a merchant shop, restaurant, retail shop, etc.

Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to (e.g., local or push) mobile notifications, communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), (e.g., consumer device) location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, and/or presence-based wireless detection (e.g., where the consumer device is detected upon entering a communicable range of a detecting device, such as a beacon or merchant device located at a merchant shop/redemption location) such as personal area networks (PAN) (e.g., using WiFi, Bluetooth, etc.), near field communication (NFC), infrared or other visual sensors, and/or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "electronic marketing communication" refers to any electronically generated information content provided by the promotion and marketing service to a consumer for the purpose of marketing a promotion, good, or service to the consumer. An electronic marketing communication may be provided as output chat data to a mobile chat session. In some embodiments, electronic marketing communications may include any local notification, push notification, email, short message service (SMS) text message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 shows an example computing system 100 within which embodiments of the present invention may operate. Consumers and merchants may access a promotion and marketing service from a promotion and marketing system 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing system 102 may comprise a server 104, a database 106, and a chat service terminal 120.

The server 104 may be embodied as a single computer or multiple computers. The server 104 may provide for receiving of electronic data from various sources, including but not necessarily limited to the consumer devices 108A-108N, the merchant devices 110A-110N, and the mobile chat system 114. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic marketing communications, including output chat data for mobile chat sessions, based on input chat data received from the mobile chat session generated by one or more consumers, and when available, other relevant electronic data (e.g., historical promotion data, electronic marketing data, consumer profiles, interests, location, preferences, etc.). The server 104 may be further configured to facilitate tracking of consumer interactions with the electronic marketing communications, which may be used to build consumer profiles for subsequent targeted offers or notifications. Although a single server 104 is shown, system 102 may include one or more servers 104. In some embodiments, the one or more servers 104 may include chat service circuitry 210, as shown in FIG. 2, configured to perform the techniques discussed herein with respect to interfacing with mobile chat sessions.

Returning to FIG. 1, database 106 may be embodied as a data storage device such as a Network Attached Storage (NAS) device or devices, or as a separate database server or servers. The database 106 includes information accessed and stored by the server 104 to facilitate the operations of the promotion and marketing system 102. For example, the database 106 may include, without limitation, merchant data, promotion/item data, user account credentials for system administrators, merchants, and consumers, promotion data indicating the products and promotions offered by the promotion and marketing service, clickstream data, analytic results, reports, financial data, and/or the like. In some embodiments, the various types of data may be organized across separate physical databases represented by a plurality of databases 106 of the system 102.

In some embodiments, the promotion and marketing system 102 may further include a chat service terminal 120. The chat service terminal 120 may be configured to be operated by an operator of the system 102 and interface with mobile chat sessions. In some embodiments, the chat service terminal 120 may be connected to mobile chat sessions as a fallback for when programmatic interfacing fails to successfully extract search terms from input chat data, fails to successfully determine one or more selected promotion from input chat data, and/or otherwise fails to successfully assist consumers connected with the mobile chat session.

The mobile chat system 114 may be configured to provide mobile chat sessions to consumer devices 108. The mobile chat system 114 may include chat server 116 and chat database 118. Chat server 116 may be configured to provide mobile chat sessions to consumer devices 108, such as via a mobile chat application that is executing on the mobile operating system of the consumer devices 108. Chat database 118 may be configured to store chat accounts and associated data, and chat data associated with mobile chat session. The mobile chat system 114 may be a separate (e.g., third party) system that is connected with the promotion and marketing system 102 via the network 112. The system 102 may be configured to associate consumer accounts (e.g., stored in database 106) with the chat accounts of the mobile chat system 112. The system 102 may interface with mobile chat system 114 to communicate with the chat accounts within mobile chat sessions. In some embodiments, the system 102 may be configured to utilize a chat service account which may send and receive chat data with other chat accounts within the mobile the chat sessions. In some embodiments, some or all of the functionality of mobile chat system 114 may be integrated with the promotion and marketing system 102. Here, each consumer or mobile chat session user may be associated with a single consumer account provided by the system 102.

The consumer devices 108A-108N may be any computing device as known in the art and operated by a consumer. Electronic data received by the server 104 from the consumer devices 108A-108N may be provided in various forms and via various methods. The consumer devices 108A-108N may include mobile devices, such as laptop computers, smartphones, netbooks, tablet computers, wearable devices (e.g., electronic watches, wrist bands, glasses, etc.), and the like. Such mobile devices may be carried by a user while a wireless network connection is established with the one or more servers 104 via network 112. In some embodiments, the consumer devices 108A-108N may include wired or stationary devices such as desktop computers or workstations. Such stationary devices may be used, for example, to interact with the promotion and marketing service, chat service, and/or mobile chat sessions.

In embodiments where a consumer device 108 is a mobile device, such as a smart phone or tablet, the consumer device 108 may execute an "app" or "mobile application" to interact with the promotion and marketing system 102, such as a mobile chat application. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing system 102 may leverage the application framework offered by the mobile operating system to allow consumers to designate which information is provided to the app and which may then be provided to the promotion and marketing system 102. In some embodiments, consumers may "opt in" to provide particular data to the promotion and marketing system 102 in exchange for a benefit, such as improved relevancy of marketing communications offered to the user. In some embodiments, the consumer may be provided with privacy information and other terms and conditions related to the information provided to the promotion and marketing system 102 during installation or use of the app. Once the consumer provides access to a particular feature of the mobile device, information derived from that feature may be provided to the promotion and marketing system 102 to improve the quality of the consumer's interactions with the promotion and marketing service.

For example, the consumer may indicate that they wish to provide location information to the app from location services circuitry included in their mobile device. Providing this information to the promotion and marketing system 102 may enable the promotion and marketing system 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing system 102. For example, the consumer may decide at a later point to disable the ability of the app to access the location services circuitry, thus limiting the access of the consumer's location information to the promotion and marketing system 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing system 102 via a web browser. As yet another example, the consumer device 108 may include various hardware or firmware designed to interface with the promotion and marketing system 102 (e.g., where the consumer device 108 is a purpose-built device offered for the primary purpose of communicating with the promotion and marketing system 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing system 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing system 102 to enable the promotion and marketing system 102 to generate promotions or other marketing information to be provided to consumers.

Example Apparatus[es] for Implementing Various Embodiments

The server 104, database 106, chat service terminal 120, chat server 116, chat database 118, consumer device 108 or merchant device 110 may be embodied by one or more computing systems or devices, such as apparatus 200 shown in FIG. 2. As illustrated in FIG. 2, the apparatus 200 may include a processor 202, a memory 204, an input/output circuitry 206, communications circuitry 208, a chat service circuitry 210, universal relevance circuitry 212, and mobile chat interface circuitry 214. The apparatus 300 may be configured to execute the operations described herein. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

When circuitry 200 is located in a server 104, circuitry 200 may further include chat service circuitry 210 and/or universal relevance circuitry 216. The chat service circuitry 210 may include hardware configured to interface with mobile chat sessions. For example, chat service circuitry 210 may receive input chat data from the mobile chat sessions generated by connected consumers, and may extract search terms and/or intent from the input chat data. Based on the extracted data, the chat service circuitry 210 may select targeted promotions and provide electronic marketing communications in the form of output chat data to the mobile chat session. The universal relevance service circuitry may be configured to perform promotion and/or item scoring and/or ranking that is targeted to individual consumers based on electronic marketing information. Additional details regarding the universal relevance service, applicable in some embodiments, are discussed in U.S. Provisional patent application Ser. No. 14/824,912, titled "Universal Relevance Service Framework," filed Aug. 12, 2015, which is incorporated by reference herein in its entirety.

When circuitry 200 is located in a consumer device 108, circuitry 200 may further include mobile chat interface circuitry 214 configured to perform the consumer device functionality discussed herein with respect to interfacing with mobile chat sessions. For example, the mobile chat interface circuitry 214 may generate the consumer interface of the mobile chat session, receive consumer device inputs for input chat data creation, provide a display of the mobile chat session, provide output chat data received from the promotion and marketing system 102 to the display, etc.

Circuitries 210-214 may utilize processing circuitry, such as the processor 202, to perform these actions. However, it should also be appreciated that, in some embodiments, one or more of circuitries 210-214 may include a separate processor, specially configured field programmable gate array (FPGA), or application specific interface circuit (ASIC). Circuitry 210-214 may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Interfacing with Mobile Chat Application

FIG. 3 shows a flow chart of an example of a method 300 of providing output chat data defining an electronic marketing communication in accordance with some embodiments. Method 300 is discussed herein as being performed by system 100, and in particular one or more servers 104 in connection with one or more consumer devices 108 and the mobile chat system 114. For example, method 300 may be performed to provide a chat service. The chat service may connect to a mobile chat server 116 of the mobile chat system to join a mobile chat session hosted by the mobile chat server 116. The chat service may provide electronic marketing communication to the mobile chat session based on input chat data generated by one or more consumers connected with the mobile chat session hosted by the mobile chat system 114. In some embodiments, other suitably configured apparatuses, devices, and/or servers may also be used to perform method 300 (as well as the other methods discussed herein). For example, the promotion and marketing system 102 may be configured to perform some or all of the functionality discussed herein with respect to the mobile chat system 114 (e.g., generating or otherwise hosting the mobile chat session).

Method 300 may begin at 302 and proceed to 304, where the one or more servers 104 (e.g., including chat service circuitry 210) may be configured to connect with a mobile chat server via a network. The one or more servers 104 may be connected with the mobile chat server 116 via the network 112. The consumer device 108 may also be connected with the mobile chat server 116 via the network 112. In some embodiments, the one or more servers 104 may be additionally or alternatively configured to directly connect to the consumer devices 108 (e.g., without interfacing through the mobile chat server 116).

In some embodiments, the mobile chat server 116 may be configured to connect with the mobile chat server as a chat account. The chat account may be a user account like the chat accounts of consumers, or may be dedicated (e.g., administrator) accounts with special privileges (e.g., custom chat interfaces, pages, etc.).

At 306, the one or more servers 104 may be configured to access a mobile chat session hosted by the mobile chat server. The one or more servers 104 may initiate the mobile chat session, or may join a mobile chat session created by a consumer. To initiate the mobile chat session, the one or more servers 104 may be configured to send an invitation to the consumer device to join the mobile chat session. The invitation may be sent via the mobile chat server 116 using built-in chat functionality of the mobile chat application. In another example, the invitation may be directly sent to the consumer device 108, such as via application alert, email, SMS text, etc., which may provide a reference or link to the mobile chat session. The one or more servers 104 may be further configured to receive, from the mobile chat server 116, an indication that the consumer device 108 has accessed the mobile chat session, and access the mobile chat session in response to receiving the indication that the consumer device 108 has accessed the mobile chat session. Chat servers/applications typically provide for the creation of chat accounts, chat sessions/groups, etc. In some embodiments, chat servers may provide for application programming interfaces (APIs) that the one or more servers 104 may use to interact with the chat server to access accounts, chat sessions/groups, send chat messages, receive chat messages, etc.

In an example where the one or more servers 104 join a mobile chat session initiated by a consumer, the mobile chat session may receive, from the mobile chat server via the network, an invitation to join the mobile chat session. The one or more servers 104 may be further configured to access the mobile chat session in response to receiving the invitation. FIG. 6 shows an example of a contacts interface 600 in accordance with some embodiments. Contacts interface 600 may be provided to the consumer device 108, such as subsequent to the consumer accessing a mobile chat application using the consumer device, and accessing a chat account (e.g., by providing login or other identification/authentication data). Contacts interface 600 may include a listing of contacts associated with the chat account. The contacts may include one or more chat account contacts 602, and a chat service account 604. Each contact may be associated with an invite to chat button 608, which may be used to send an invitation to a mobile chat session. The consumer may select the invite to chat button 608 associated with the chat service account 604 to invite the chat service account to join the mobile chat session. Alternatively, the one or more servers 104 may send the invitation to the consumer device, which may be indicated by and accessed via join chat button 606.

At 308, the one or more servers 104 may be configured to receive input chat data from the mobile chat server 116. The input chat data may define a message generated by the consumer device 108 with a concurrent connection to the mobile chat session. The mobile chat server 116 may receive the input chat data from the consumer device, and may provide the input chat data as a message within a chat interface of one or more consumer devices connected with the mobile chat session. The mobile chat server 116 may be further configured to provide the input chat data to the one or more servers 104, such as via updating a message display of the mobile chat session and/or via a separate communication.

FIG. 7 shows an example chat interface 700, in accordance with some embodiments. The chat interface 700 may be displayed on the consumer device when the consumer device has accessed the mobile chat session. The chat interface 700 may include a message display 702 and a message input bar 704. The message display 702 may be configured to display messages (e.g., chronologically) generated by chat accounts connected to the mobile chat session. The message input bar 704 may include message input 706 configured to receive the input chat data, and send button 708 configured to trigger the sending of the input chat data from the consumer device 108 to the mobile chat server 116. The mobile chat server 116 may then provide the input chat data to the one or more servers 104, as shown by consumer message 710. The chat interface 700 may further include chat service messages created by the promotion and marketing service 102 in response to consumer messages. For example, the chat service message 712 includes an indication of one or more targeted promotions selected based on the consumer message 710, as discussed in greater detail below.

At 310, the one or more servers 104 may be configured to analyze the input chat data to determine a chat account and associated message text. For example, where the input chat data may be defined by a data structure that includes a chat account identifier and the associated message text. In another example, the one or more servers 104 may be configured to extract the chat account and the associated message text from a string, such as by searching the string for a chat account identifier and associating other portions of the input chat data as the message text. In some embodiments, the one or more servers 104 may interface with the chat server via an API that provides for receiving and sending of messages according to predefined formats. The API may include, for incoming messages, a sender name field that defines or identifies the sending user, and an associated message field defining the (e.g., text) data of the message.

At 312, the one or more servers 104 may be configured to determine a consumer account including consumer data associated with the chat account. The consumer account may be managed by the promotion and marketing system 102, with the associated consumer data stored in the one or more databases 106. Thus one or more servers 104 may associated the managed consumer account with the (e.g., third party) chat account.

The system 102 may host, manage, and update the consumer account. For example, the one or more servers 104 of the system 102 may receive electronic marketing information from various networked devices (e.g., clickstream data and discretionary data from consumer devices, transaction data from merchant devices that interact with consumer devices, etc.) in the course of providing the promotion and marketing service, and may use the electronic marketing information to build a profile. In some embodiments, the consumer data associated with the profile may be used, in combination with the input chat data generated by the associated chat account within the mobile chat session, to select promotions that are targeted to particular consumers. In some embodiments, the chat account and consumer account may be the same account (e.g., provided by the system 102).

At 314, the one or more servers 104 may be configured to determine whether one or more search terms can be extracted from the message text. The one or more servers 104 may be configured to attempt to extract the one or more search terms from the message text of the input chat data. With reference to consumer message 710 shown in FIG. 7, for example, search terms such as "restaurant" and "Palo Alto" may be extracted from the message text "Service restaurant in Palo Alto." In some embodiments, search terms that are to be extracted may be stored in the database and retrieved for comparison with the message text.

In some embodiments, the consumer may select which messages are directed to or otherwise will be used by the promotion and marketing service using a call command. For example, the use of "Service" at the beginning of the message text within the consumer message 710 may indicate that the message text is directed to the promotion and marketing service and the chat service account. Advantageously, multiple consumers within the chat session may conduct conversations without triggering a response from the chat service account. In some embodiments, the use of a call command may also be used for triggering a response message from the promotion and marketing service. For example, the one or more servers 104 may access and receive and/or analyze message text between two consumers, but only send a response message upon receiving the call command. In some embodiments, however, no call command is used and the one or more servers 104 may be configured to collect and/or analyze each of the consumer messages within the chat session.

In response to determining that no search term can be extracted from the message text, method 300 may proceed to 316, where the one or more servers 104 may be configure to connect a chat service terminal 120 to the mobile chat session. The chat service terminal 120 may be manually controlled by an operator of the promotion and marketing system 102. Thus the system 102 is able to provide more human-based mobile chat interactions when programmatic interactions are deemed insufficient or unsuitable.

In some embodiments, the chat service terminal 120 may be given control of the chat service account within the mobile chat session. The transition from programmatic control to live user control of the chat service account may be invisible to the other (e.g., consumer) chat accounts and/or the mobile chat session. The chat service terminal 120 may be configured to generate the (e.g., graphical) chat session and messages to assist the live operator. In another example, the one or more servers 104 may provide an indication, such as via output chat data, that the chat service account has been transitioned to the live operator. In another example, a second chat service account associated with the chat service terminal 120 may enter the mobile chat session, such as in addition or in replacement of the programmatic chat service account. In some embodiments, the programmatic chat service account may be configured to generate and send an invitation to join the mobile chat session to the second chat service account associated with the chat service terminal 120. The chat service terminal 120 may then access the mobile chat session in response to the invite.

In some embodiments, the one or more servers 104 may be configured to compare the message text with a dictionary database of valid search terms to determine whether search term can be extracted from the message text. The database may include words, phrases, merchant names, locations, items, categories, subcategories, etc. The one or more servers 104 may be configured to determine that no search term can be extracted when the message text does not include any valid search terms. In another example, the one or more servers 104 may be configured to connect the chat service terminal to the mobile chat session based on detecting some other error condition, and/or in response to receiving a request from a chat account within the mobile chat session.

In some embodiments, the one or more servers 104 may be configured to interact with the consumer via the mobile chat session to request input chat data defining missing or useful search terms, as discussed in greater detail below in connection with method 400 and FIG. 4.

Returning to 314, in response to determining that one or more search terms were successfully extracted from the message text, method 300 may proceed to 318, where the one or more servers 104 may be configured to determine promotions scores of candidate promotions based at least in part on the one or more search terms, the promotion data, and the consumer data. The promotion scores of the candidate promotions may indicate the level of relevance of the candidate promotions to the relevance input data including the one or more search terms, the promotion data, and the consumer data. The level of relevance may be measured in various ways, such as expected access rate, conversion rate, revenue rate, etc., which may be calculated based on historical performance/clickstream data of the promotion (or similar other promotions) previously offered. The candidate promotions may be stored as promotion data within the one or more databases 106 of the promotion and marketing system 102.

In some embodiments, the candidate promotions may be scored and/or ranked by a universal relevance service provided by the promotion and marketing system 102 (e.g., the one or more servers 104). For example, the universal relevance service may receive the relevance input data, and may be configured to score the candidate promotions based on comparing promotion parameters of the promotions with the relevance input data. Additional details regarding a universal relevance service, applicable in some embodiments, are discussed in U.S. patent application Ser. No. 14/824,912, which is incorporated by reference above.

In some embodiments, the relevance input data may include location data defining the consumer device location. Thus promotions with redemption locations (e.g, a merchant shop) near the consumer device location may be scored higher or otherwise given a higher priority than promotions that are further from the consumer device location. The location data may be determined using various suitable techniques, such as global positioning system (GPS), wireless-assisted GPS, indoor navigation systems, cellular tower triangulation techniques, video surveillance systems, presence-based wireless detectors, personal area networks (PAN) such as Bluetooth or WiFi, infrared or other visual sensors, RFID location systems, etc. In some embodiments, the consumer device 108 may include GPS receivers configured to communicate with (e.g., three or more) orbiting satellites to determine the location data based on trilateration. In some embodiments, the consumer device 108 may not include a GPS receiver and may instead transmit signals received from satellites to a GPS server configured to perform location data determination (e.g., based on trilateration). In another example, the consumer device 108 may be configured to determine the location data based on cell tower triangulation of signal strength levels. In some embodiments, the location data may be defined by consumer data, such as based on tracking historical consumer device locations. Here, promotions may be ranked or scored based on common travel paths, commutes, etc.

In some embodiments, the location data used for the relevance input data may be defined based on the input chat data generated by the consumer device within the mobile chat session. With reference to consumer message 710 shown in FIG. 7, for example, search terms associated with a location such as "Palo Alto" may be used in addition or alternative to a programmatically determined consumer device location.

At 320, the one or more servers 104 may be configured to determine a promotion ranking of the candidate promotions based on the promotion scores. For example, the candidate promotions may be ranked based on the promotion scores such that the more relevant or targeted candidate promotions are ranked higher than less relevant or targeted candidate promotions.

At 322, the one or more servers 104 may be configured to determine whether to select or more promotions (or "selected promotions") based on the promotion scores and/or promotion ranking. In some embodiments, the one or more servers may be configured to select the top N ranking candidate promotions, where N is a predefined number (e.g., 1, 2, 3, etc.). In some embodiments, the predefined number of selected promotions may be selected based on chat data requirements or specifications (e.g., character limits, media limits, file size limits, etc.) of the mobile chat session.

In some embodiments, the number of selected promotions may be determined based on a predefined promotion score threshold. For example, the candidate promotions with promotion scores that exceed the predefined threshold (or a highest ranking subset thereof) may be selected. Where no candidate promotion has a promotion score that satisfied the predetermined promotion score threshold, or are otherwise deemed suitable for presentation (e.g., no results returned from the universal relevance service), the one or more servers 104 may be configured to select no candidate promotions.

In response to determining that no candidate promotion is selected based on the promotion scores and/or promotion ranking, method 300 may proceed to 316, where the one or more servers 104 may be configured to connect the chat service terminal to the mobile chat session.

Returning to 322, in response to determining to select one or more candidate promotions based on the promotion scores and/or promotion ranking, method 300 may proceed to 324, where the one or more servers 104 may be configured to generate output chat data defining an electronic marketing communication of the selected one or more promotions. At 326, the one or more servers 104 may be configured to provide the output chat data to the mobile chat server 116.

The output chat data may include an indication of the selected one or more promotions and at least some of the associated promotion data (e.g., item, merchant name, description, category, promotional value, accepted value, etc.). Additionally or alternatively, the output chat data may include a reference or link to purchase or otherwise accept one of the selected promotions. With reference to FIG. 7, the output chat data generated by the one or more servers 104 may be provided to the chat service message 712. The output chat data may define links 714 that upon selection cause the consumer interface to enter an electronic purchase funnel, or the like, for linked promotion. Additionally or alternatively, a link 714 may provide a reference to another communication channel for the electronic marketing information. For example, the link 714 may launch a separate consumer application (e.g., configured for interactions with the promotion and marketing system 102 that are independent of the mobile chat system 114), launch a mobile browser and referenced webpage, etc. In some embodiments, the purchase funnel may be integrated within the mobile chat session. For example, the chat service message 712 may include interactive buttons, links, interfaces, etc. to enable promotion purchase within the chat interface. Method 300 may then proceed to 328 and end.

FIG. 4 shows a flow chart of an example of a method 400 of determining promotions scores of candidate promotions based on input chat data, in accordance with some embodiments. Method 400 may be performed to provide interactive mobile chat sessions wherein the chats service account may programmatically conduct conversations with chat accounts to improve candidate promotion targeting efficiency and accuracy. Furthermore, the programmatic interaction may be configured to guide consumers in interacting with the promotion and marketing service via the mobile chat session, and providing necessary or otherwise useful relevance input data for promotion scoring and/or ranking via messaging within the mobile chat session. Advantageously, the real-time interactive nature of chat sessions may be utilized to provide gaps in targeting data for users within the promotion and marketing system 102 that would not otherwise be possible, and to programmatically present targeted data in an efficient, intuitive chat interface.

Method 400 may begin at 402 and proceed to 404, where the one or more servers 104 may be configured to determine one or more search terms based on message text. The discussion at 314 of method 300 may be applicable at 404.

FIG. 8 shows an example chat interface 800, in accordance with some embodiments. The chat interface 800 may be displayed on the consumer device when the consumer device has accessed the mobile chat session. The chat interface 800 may include a message display 802 and a message input bar 804. Input chat data received by the mobile chat server 116 from the consumer device 108 may be displayed within the message display 802, as shown by consumer messages 806, 810, and 814. Similarly, output chat data received by the mobile chat server 116 from the one or more servers 104 may also be displayed within the message display 802, as shown by chat service messages 808, 812, and 816. With reference to consumer message 806, for example, the one or more server 104 may be configured to determine a search term "restaurant" based on the message text "Restaurant." In this example, a call command is not used to trigger a response from the chat service account.

At 406, the one or more servers 104 may be configured to determine promotion search parameters. A promotion search parameter, as used herein, refers to a category of search term. Some example promotion search parameters may include location (e.g., with example search terms including "Palo Alto," "nearby," "downtown," etc.), merchant category (e.g., with example search terms including "restaurants," "hotels," "shopping," etc.), item category/subcategory (e.g., with example search terms including "food," "computers," "books," etc., or subcategories such as "thrillers," "comedy," "horror," etc. for the books category), time (e.g., with example search terms including "lunch," "now," "tomorrow," etc.), or price range (e.g., "expensive," "cheap," "fast food," "fine dining," price values, etc.).

At 408, the one or more servers 104 may be configured to determine promotion search parameter values based on matching the one or more search terms with the promotion search parameters. For example, the search term "Palo Alto" may be matched with the location promotion search parameter as being a search term defining the location category. In another example, the search term "restaurant" may be matched with the merchant category promotion search parameter. Thus the one or more servers 104 may be configured to attempt to match each of the one or more search terms extracted from the input chat data to a promotion search parameter. Once match, the search term may define a promotion search parameter value of the promotion search parameter.

At 410, the one or more servers 104 may be configured to determine whether there is one or more missing search parameter values based on the matching of the one or more search terms with the promotion search parameters. A search parameter value may be determined to be missing for various reasons. For example, the one or more servers 104 may be configured to require that a search term has been matched to at least one of the predefined promotion search parameters. Here, if none of the search terms match any of the promotion search parameters, the promotion search parameter values may be determined to be missing. In another example, a minimum number (e.g., 2, 3, etc.) of promotion search parameters must be matched with the search terms, and a search parameter value may be determined to be missing if less than the minimum number of promotion search parameters have been identified. In yet another example, one or more of the promotion search parameters may be defined as being required. For example, where the location promotion search parameter is required, the one or more servers 104 may determine that the location promotion search parameter is missing when none of the search terms can be matched and when the location promotion search parameter is defined as being requiring a valid location promotion search parameter value.

In some embodiments, one or more search parameter values may be determined to be missing based on the search results of the universal relevance service. For example, where more than a predetermined number of high scoring (e.g., compared to one or more thresholds) candidate promotions are returned based on a search that only includes item category, and thus the one or more servers may request additional search terms associated with one or more other search parameter values.

In response to determining that there is one or more missing search parameter values, method 400 may proceed to 412, where the one or more servers 104 may be configured to generate output chat data defining a request for the missing promotion search parameter values. The method 400 may also proceed to 413 to provide the second output chat data to the mobile chat server. With reference to chat interface 800 shown in FIG. 8, the output chat data may be displayed within the message display 802 as shown by chat service message 808. Here, the output chat data defines a request for the location search parameter value by stating "Where do you want to go eat?" In some embodiments, for each promotion search parameter that can be requested, the one or more servers 104 may be configured to select from one or more predefined message texts for requesting the particular promotion search parameter (e.g., "where would you like to go?").

At 414, the one or more servers 104 may be configured to receive second input chat data from the consumer device. At 416, the one or more servers 104 may be configured to analyze the second input chat data to determine associated second message text. At 418, the one or more servers 104 may be configured to determine one or more second search terms based on the second message text. Some or all of the discussion at 308-314 of method 300 may be applicable at 414-418.

At 420, the one or more servers 104 may be configured to determine whether the one or more second search terms includes the one or more missing search parameter values. With reference to FIG. 8, the consumer message 810 includes the message text "Palo Alto," which may be determined as an additional search term. In that sense, one or more second search terms may be determined. For example, the input chat data response may include "Palo Alto for lunch." Here, the search term "lunch" may be also determined as a time promotion search parameter value.

Alternatively, the input chat data provided in response to the request for the missing promotion search parameter values may not include any valid search terms, or search terms that are matched to a missing search parameter value.

In response to determining that the one or more second search terms fail to include the one or more missing search parameter values, method 400 may return to 414, where the one or more servers 104 may be configured to receive (e.g., third) input chat data from the consumer device.

Returning to 420, in response to determining that the one or more second search terms includes the one or more missing search parameter values, method 400 may proceed to 422, where the one or more servers 104 may be configured to determine one or more additional promotion search parameter values based on the one or more search terms.

In some embodiments, the one or more servers 104 may be configured to connect the chat service terminal 116 to the mobile chat session subsequent to a predefined number of input chat data messages that fail to successfully provide a proper or matched search term to the requested missing search parameter value.

Method 400 may then return to 410, where the one or more servers may be configured to determine whether there remains one or more missing search parameter values. The one or more servers 104 may continue to extract message text until the missing search parameter values have been provided by the consumer.

With reference to the chat interface 800 shown in FIG. 8, for example, output chat data may be displayed within the message display 802 as shown by chat service message 812. Here, the output chat data defines a request for the item category search parameter value by stating "What kind of food do you feel like?" The one or more servers 104 may be configured to associate predefined message text or text templates (e.g., within a database) for each search parameter value, and thus may use the predefined message to programmatically request the corresponding search parameter value. Similarly, the one or more servers 104 may receive additional input chat data including a response with one or more search terms, as shown by consumer message 814. Here, the consumer message 814 defines the search term "Italian" which may be used as the item category promotion search parameter value for the item category promotion search parameter.

In response to determining that no missing (e.g., required) search parameter values remain, method 400 may proceed to 424, where the one or more servers 104 may be configured to determine promotion scores of candidate promotions based on the promotion parameter search values. Furthermore, the promotion scores and/or promotion ranking may be used to generate output chat data defining an electronic marketing communication of one or more selected promotions, as shown at chat service message 816. The discussion at 318 of method 300 may be applicable at 424. Method 400 may then proceed to 426 and end.

FIG. 5 shows a flow chart of an example of a method 500 of interfacing with a mobile chat session including multiple consumers, in accordance with some embodiments. The system 102 may be configured to extract intentions, search terms, etc. from conversations involving multiple consumers within a mobile chat session. Furthermore, consumer accounts and profile information about the multiple consumers may be combined with the extracted chat data to provide electronic marketing information targeted to the multiple consumers.

Method 500 may begin at 502 and proceed to 504, where the one or more servers 104 may be configured to connect with a mobile chat server 116 via a network. At 506, the one or more servers 104 may be configured to access a mobile chat session hosted by the mobile chat server 116. At 508, the one or more servers 104 may be configured to receive input chat data from the mobile chat server 116 generated by a first consumer device 108. The discussion at 304-308 of method 300 may be applicable at 504-508.

At 510, the one or more servers 104 may be configured to receive second input chat data from the mobile chat server 116 generated by a second consumer device 108. The second consumer device 108 may be concurrently connected with the mobile chat server 116, the first consumer device 108, and the one or more servers. The second consumer device 108 may be associated with a second chat account of the mobile chat system 114, and a second consumer account of the promotion and marketing system 102.

FIG. 9 shows an example of a chat interface 900, in accordance with some embodiments. The chat interface 900 may include a message display 902 and a message input bar 904. Input chat data generated from the multiple consumer devices may be provided to the message display 902, such as consumer messages 906, 910, and 914 associated with a first chat account, and consumer messages 908 and 912 associated with the second chat account.

At 512, the one or more servers 104 may be configured to determine one or more search terms from the input chat data and the second input chat data. For example, the search terms "Italian," "restaurant," and "Palo Alto" may be extracted from the consumer messages 906, 910, and 912. Thus the one or more servers 104 may extract search terms from a conversation involving multiple chat accounts. In some embodiments, the one or more servers 104 may be further configured to determine intentions and sentiments based on input chat data, such as based on natural language processing (NLP) techniques or the like.

At 514, the one or more servers 104 may be configured to determine an output chat message based on the one or more search terms as discussed in methods 300/400. For example, the chat service message 816 may include an electronic marketing communication of one or more selected promotions based at least in part on the search terms received from the multiple chat accounts.

With respect to method 300, the one or more servers 104 may be configured to determine promotions scores of candidate promotions based at least in part on the one or more search terms, promotion data, and consumer data associated with the both the first chat account and the second chat account. In that sense, the targeting of selected promotions may be determined based on relevance to both consumers.

With respect to method 400, the one or more servers 104 may be configured to send requests for the missing promotion search parameter values and may receive input chat data from one or more of the first chat account and the second chat account to determine search terms that match the requested promotion search parameters.

The output chat data including the electronic marketing communication may be presented (e.g., in-line with consumer messages) within the message display 902. The consumers are able to discuss the pros and cons of promotions before choosing one and initiating a purchase. Method 500 may then proceed to 516 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system for interfacing with a real-time mobile chat session hosted by a mobile chat server via a network, comprising:

one or more databases configured to:

store consumer accounts, wherein each consumer account includes consumer data associated with a chat account for accessing the real-time mobile chat session; and store promotion data defining promotions;

one or more servers comprising a processor configured to:

establish a first network connection with the mobile chat server via a communication protocol associated with at least one communication channel of the network;

access the real-time mobile chat session hosted by the mobile chat server via an application programming interface associated with the real-time mobile chat session;

receive input chat data from the mobile chat server, wherein the input chat data defines a plurality of messages generated by a plurality of consumer devices, each consumer device having a concurrent network connection to the real-time mobile chat session, and wherein the input chat data is presented via at least an electronic interface of a consumer device from the plurality of consumer devices;

determine whether a call command included at a beginning of a message from the plurality of messages corresponds to a defined text string, the defined text string configured to trigger a request to generate an electronic promotion message comprising one or more promotions based on message text included after the call command in the message;

in response to triggering of the request to generate the electronic promotion message based on a determination that the call command included at the beginning of the message corresponds to the defined text string, determine, based on the input chat data and intention data for the input chat data that is generated based on one or more natural language processing techniques, a unique chat account related to the consumer device and content of the message text included in the message, wherein natural language processing of the message text is triggered only when the call command is determined to be included at the beginning of the message;

determine location data for the consumer device, wherein the location data is determined based on a global positioning system (GPS) associated with the consumer device, cellular tower triangulation associated with the consumer device, or a personal area network (PAN) associated with the consumer device;

determine one or more search terms included after the call command based on the content of the message text;

determine a number of search parameter values associated with the one or more search terms;

determine a predefined search parameter value associated with the one or more search terms;

compare the number of search parameter values with a threshold number of search parameter values, wherein the threshold number of search parameter values is two or more;

in response to a determination that the predefined search parameter value is missing based on the number of search parameter values being below the threshold number of search parameter values, transmit first output chat data to the mobile chat server to render the first output chat data via the electronic interface during the real-time mobile chat session, wherein the first output chat data is a defined request to obtain one or more additional search terms from additional message text provided during the real-time mobile chat session, and wherein the defined request satisfies both the predefined search parameter value and the threshold number of search parameter values;

receive the one or more additional search terms during the real-time mobile chat session;

compare collective search terms, that comprise the one or more search terms and the one or more additional search terms, with a set of valid search terms stored in a dictionary database; and in response to a determination that the collective search terms match one or more valid search terms from the set of valid search terms, determine promotion scores of candidate promotions based at least in part on the collective search terms, the promotion data, and the location data associated with the consumer device;

determine a promotion ranking of the candidate promotions based on the promotion scores;

select a top N ranked number of promotions from the promotion ranking;

generate second output chat data that defines at least a portion of the electronic promotion message, wherein the second output chat data comprises the top N ranked number of promotions; and transmit the second output chat data to the mobile chat server, wherein the mobile chat server is configured to establish a second network connection with the consumer device, wherein the second output chat data is configured to render the top N ranked number of promotions via the electronic interface during the real-time mobile chat session.

2. The system of claim 1, wherein the one or more servers configured to determine the promotion scores of candidate promotions includes the one or more servers being configured to:

determine the promotion scores of the candidate promotions based at least in part on the consumer data associated with the unique chat account.

3. The system of claim 1, wherein the one or more additional search terms define at least one of:

a location;
a merchant;
a price;
a time; or
an item category.

4. The system of claim 1, wherein the message text comprises first message text, and wherein the one or more servers are further configured to:

receive second chat data from the mobile chat server, wherein the second chat data includes a second message generated by a second consumer device with a connection to the real-time mobile chat session concurrent with the one or more servers and the consumer device;

determine, based on the second chat data, a second chat account and second message text;

determine a second consumer account including second location data associated with the second chat account;

determine one or more second search terms based on the second message text; and determine second promotion scores of the candidate promotions based at least in part on the collective search terms, the one or more second search terms, the promotion data, the location data, and the second location data.

5. The system of claim 1, wherein the one or more servers are further configured to:

receive, from the mobile chat server via the network, an invitation to join the real-time mobile chat session; and access the real-time mobile chat session in response to receiving the invitation.

6. The system of claim 1, wherein the one or more servers are further configured to:

send an invitation to join the real-time mobile chat session to the consumer device;

receive, from the mobile chat server, an indication that the consumer device has accessed the real-time mobile chat session; and access the real-time mobile chat session in response to receiving the indication that the consumer device has accessed the real-time mobile chat session.

7. The system of claim 1, further comprising a chat service terminal, and wherein the one or more servers are further configured to:
- receive second input chat data from the mobile chat server, wherein the second input chat data defines a second message generated by the consumer device;
- attempt to extract one or more second search terms from the second input chat data; and
- in response to failing to extract the one or more second search terms from the second input chat data, connect the chat service terminal to the real-time mobile chat session.

8. The system of claim 1 further comprising a chat service terminal, and wherein the one or more servers are further configured to:
- receive second input chat data from the mobile chat server, wherein the second input chat data defines a second message generated by the consumer device;
- attempt to determine a second selected promotion based on the second input chat data; and
- in response to failing to determine a second selected promotion from the second input chat data, connect the chat service terminal to the real-time mobile chat session.

9. A method for interfacing with a real-time mobile chat session hosted by a mobile chat server via a network, comprising:
- associating, by one or more servers, consumer accounts including consumer data with chat accounts for accessing the real-time mobile chat session;
- determining, by the one or more servers, promotion data defining promotions;
- establishing, by the one or more servers, a first network connection with the mobile chat server via a communication protocol associated with at least one communication channel of the network;
- accessing, by the one or more servers, the real-time mobile chat session hosted by the mobile chat server via an application programming interface associated with the real-time mobile chat session;
- receiving, by the one or more servers, input chat data from the mobile chat server, wherein the input chat data defines plurality of messages generated by a plurality of consumer devices, each consumer device having a concurrent network connection to the real-time mobile chat session, and wherein the input chat data is presented via at least an electronic interface of a consumer device from the plurality of consumer devices;
- determining, by the one or more servers, whether a call command included at a beginning of a message from the plurality of messages generated by the plurality of consumer devices corresponds to a defined text string, the defined text string configured to trigger a request to generate an electronic promotion message comprising one or more promotions based on message text included after the call command in the message;
- in response to triggering of the request to generate the electronic promotion message based on determining that the call command included at the beginning of the message corresponds to the defined text string,
  - determining, by the one or more servers, and based on the input chat data and intention data for the input chat data that is generated based on one or more natural language processing techniques, a unique chat account related to the consumer device and content of the message text included in the message, wherein natural language processing of the message text is triggered only when the call command is determined to be included at the beginning of the message;
- determining, by the one or more servers, location data for the consumer device, wherein the location data is determined based on a global positioning system (GPS) associated with the consumer device, cellular tower triangulation associated with the consumer device, or a personal area network (PAN) associated with the consumer device;
- determining, by the one or more servers, one or more search terms included after the call command based on the content of the message text;
- determining, by the one or more servers, a number of search parameter values associated with the one or more search terms;
- determining, by the one or more servers, a predefined search parameter value associated with the one or more search terms;
- comparing, by the one or more servers, the number of search parameter values with a threshold number of search parameter values, wherein the threshold number of search parameter values is two or more;
- in response to a determination that the predefined search parameter value is missing based on the number of search parameter values being below the threshold number of search parameter values, transmitting, by the one or more servers, first output chat data to the mobile chat server to render the first output chat data via the electronic interface during the real-time mobile chat session, wherein the first output chat data is a defined request to obtain one or more additional search terms from additional message text provided during the real-time mobile chat session, and wherein the defined request satisfies both the predefined search parameter value and the threshold number of search parameter values;
- receiving, by the one or more servers, the one or more additional search terms during the real-time mobile chat session;
- comparing, by the one or more servers, collective search terms, that comprise the one or more search terms and the one or more additional search terms, with a set of valid search terms stored in a dictionary database; and
- in response to a determination that the collective search terms match one or more valid search terms from the set of valid search terms,
  - determining, by the one or more servers, promotion scores of candidate promotions based at least in part on the collective search terms, the promotion data, and the location data associated with the consumer device;
  - determining, by the one or more servers, a promotion ranking of the candidate promotions based on the promotion scores;
  - selecting, by the one or more servers, a top N ranked number of promotions from the promotion ranking;
  - generating, by the one or more servers, second output chat data that defines at least a portion of the electronic promotion message, wherein the second output chat data comprises the top N ranked number of promotions; and
  - transmitting, by the one or more servers, the second output chat data to the mobile chat server, wherein the mobile chat server is configured to establish a second network connection with the consumer device, wherein the second output chat data is configured to render the top N ranked number of promotions via the electronic interface during the real-time mobile chat session.

10. The method of claim 9, wherein determining the promotion scores of candidate promotions further includes determining the promotion scores of the candidate promotions based at least in part on the consumer data.

11. The method of claim 9, wherein the one or more additional search terms define at least one of:
a location;
a merchant;
a price;
a time; or
an item category.

12. The method of claim 9, wherein the message text comprises first message text, and the method further comprising, by the one or more servers:
receiving second chat data from the chat session, wherein the second chat data includes a second message generated by a second consumer device with a connection to the real-time mobile chat session concurrent with the one or more servers and the consumer device;
determining, based on the second chat data, a second chat account and second message text;
determining a second consumer account including second location data associated with the second chat account;
determining one or more second search terms based on the second message text; and
determining second promotion scores of the candidate promotions based at least in part on the collective search terms, the one or more second search terms, the promotion data, the location data, and the second location data.

13. The method of claim 9 further comprising, by the one or more servers:
receiving, from the mobile chat server via the network, an invitation to join the real-time mobile chat session; and
access the real-time mobile chat session in response to receiving the invitation.

14. The method of claim 10 further comprising, by the one or more servers:
sending an invitation to join the real-time mobile chat session to the consumer device;
receiving, from the mobile chat server, an indication that the consumer device has accessed the real-time mobile chat session; and
accessing the real-time mobile chat session in response to receiving the indication that the consumer device has accessed the real-time mobile chat session.

15. The method of claim 9 further comprising, by the one or more servers:
receiving second input chat data from the mobile chat server, wherein the second input chat data defines a second message generated by the consumer device;
attempting to extract one or more second search terms from the second input chat data; and
in response to failing to extract the one or more second search terms from the second input chat data, connecting a chat service terminal to the real-time mobile chat session.

16. The method of claim 10 further comprising, by the one or more servers:
receiving second input chat data from the mobile chat server, wherein the second input chat data defines a second message generated by the consumer device;
attempting to determine a second selected promotion based on the second input chat data; and
in response to failing to determine a second selected promotion from the second input chat data, connecting a chat service terminal to the real-time mobile chat session.

17. A computer program product, stored on a non-transitory computer readable medium, comprising instructions that when executed by one or more computers cause the one or more computers to:
associate consumer accounts including consumer data with chat accounts for accessing a real-time mobile chat session hosted by a mobile chat server;
determine promotion data defining promotions;
establish a first network connection with the mobile chat server via a communication protocol associated with at least one communication channel of a network;
access the real-time mobile chat session hosted by the mobile chat server via an application programming interface associated with the real-time mobile chat session;
receive input chat data from the mobile chat server, wherein the input chat data defines plurality of messages generated by a plurality of consumer devices, each consumer device having a concurrent network connection to the real-time mobile chat session, and wherein the input chat data is presented via at least an electronic interface of a consumer device from the plurality of consumer devices;
determine whether a call command included at a beginning of a message from the plurality of messages generated by the plurality of consumer devices corresponds to a defined text string, the defined text string configured to trigger a request to generate an electronic promotion message comprising one or more promotions based on message text included after the call command in the message;
in response to triggering of the request to generate the electronic promotion message based on determining that the call command included at the beginning of the message corresponds to the defined text string,
determine, based on the input chat data and intention data for the input chat data that is generated based on one or more natural language processing techniques, a unique chat account related to the consumer device and content of the message text included in the message, wherein natural language processing of the message text is triggered only when the call command is determined to be included at the beginning of the message;
determine location data for the consumer device, wherein the location data is determined based on a global positioning system (GPS) associated with the consumer device, cellular tower triangulation associated with the consumer device, or a personal area network (PAN) associated with the consumer device;
determine one or more search terms included after the call command based on the content of the message text;
determine a number of search parameter values associated with the one or more search terms;
determine a predefined search parameter value associated with the one or more search terms;
compare the number of search parameter values with a threshold number of search parameter values, wherein the threshold number of search parameter values is two or more;

in response to a determination that the predefined search parameter value is missing based on the number of search parameter values being below the threshold number of search parameter values, transmit first output chat data to the mobile chat server to render the first output chat data via the electronic interface during the real-time mobile chat session, wherein the first output chat data is a defined request to obtain one or more additional search terms from additional message text provided during the real-time mobile chat session, and wherein the defined request satisfies both the predefined search parameter value and the threshold number of search parameter values;

receive the one or more additional search terms during the real-time mobile chat session;

compare collective search terms, that comprise the one or more search terms and the one or more additional search terms, with a set of valid search terms stored in a dictionary database;

in response to a determination that the collective search terms match one or more valid search terms from the set of valid search terms, determine promotion scores of candidate promotions based at least in part on the collective search terms, the promotion data, and the location data associated with the consumer device;

determine a promotion ranking of the candidate promotions based on the promotion scores;

select a top N ranked number of promotions from the promotion ranking;

generate second output chat data that defines at least a portion of the electronic promotion message, wherein the second output chat data comprises the top N ranked number of promotions; and transmit the second output chat data to the mobile chat server, wherein the mobile chat server is configured to establish a second network connection with the consumer device, wherein the second output chat data is configured to render the top N ranked number of promotions via the electronic interface during the real-time mobile chat session.

18. The computer program product of claim 17, wherein the computer program product further comprises instructions that when executed by the one or more computers cause the one or more computers to:

receive, from the mobile chat server via the network, an invitation to join the real-time mobile chat session; and access the real-time mobile chat session in response to receiving the invitation.

19. The computer program product of claim 17, wherein the computer program product further comprises instructions that when executed by the one or more computers cause the one or more computers to:

send an invitation to join the real-time mobile chat session to the consumer device;

receive, from the mobile chat server, an indication that the consumer device has accessed the real-time mobile chat session; and access the real-time mobile chat session in response to receiving the indication that the consumer device has accessed the real-time mobile chat session.

20. The computer program product of claim 17, wherein the computer program product further comprises instructions that when executed by the one or more computers cause the one or more computers to:

determine the promotion scores of the candidate promotions based at least in part on the consumer data associated with the unique chat account.

\* \* \* \* \*